United States Patent
Steed et al.

(12)

(10) Patent No.: US 6,412,028 B1
(45) Date of Patent: Jun. 25, 2002

(54) OPTIMIZING SERIAL USB DEVICE TRANSFERS USING VIRTUAL DMA TECHNIQUES TO EMULATE A DIRECT MEMORY ACCESS CONTROLLER IN SOFTWARE

(75) Inventors: Michael R. Steed, Round Rock; David W. Madden, Austin, both of TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/286,701

(22) Filed: Apr. 6, 1999

(51) Int. Cl.[7] .......................... G06F 13/14; G06F 13/20
(52) U.S. Cl. .......................... 710/22; 710/15; 710/23; 710/308; 709/301; 702/127
(58) Field of Search .................... 395/500.46; 709/301; 702/127; 710/15, 22, 23, 308

(56) References Cited

U.S. PATENT DOCUMENTS

| | | | |
|---|---|---|---|
| 5,548,711 A | * 8/1996 | Brant et al. | 395/182.03 |
| 5,564,061 A | * 10/1996 | Davies et al. | 395/884 |
| 5,826,106 A | * 10/1998 | Pang | 395/845 |
| 5,926,775 A | * 7/1999 | Brumley et al. | 702/127 |
| 6,078,742 A | * 6/2000 | Chow | 395/500.46 |

* cited by examiner

Primary Examiner—Jeffrey Gaffin
Assistant Examiner—Rehana Perveen
(74) Attorney, Agent, or Firm—Conley, Rose & Tayon; Jeffrey C. Hood

(57) ABSTRACT

A USB-based data acquisition system including virtual DMA software which increases USB data transfer rates with minimal changes to DAQ driver level software. The virtual DMA software operates to receive or intercept DMA instructions provided by the DAQ driver level software to program a DMA controller to acquire data from the device. The virtual DMA software intercepts the DMA instructions and emulates operation of the DMA controller in software. The virtual DMA software operates to request the data in bulk packets from the device. The virtual DMA software then stores the received packets of data in the addresses specified in the DMA instructions. The virtual DMA software thus emulates operation of a DMA device, thus "fooling" the DAQ driver level software into thinking the data is being acquired using real DMA transfers. Thus, the present invention allows for much faster data transfers, while requiring minimal or no changes to the existing DAQ driver level software.

20 Claims, 8 Drawing Sheets

OPTIMIZING SERIAL USB DEVICE TRANSFERS USING VIRTUAL DMA TECHNIQUES TO EMULATE A DIRECT MEMORY ACCESS CONTROLLER IN SOFTWARE

FIELD OF THE INVENTION

The present invention relates to USB data acquisition (DAQ) systems, and particularly to a virtual DMA implementation which emulates a direct memory access (DMA) device in software for improved USB data acquisition performance.

DESCRIPTION OF THE RELATED ART

Scientists and engineers often use DAQ systems to perform a variety of functions, including laboratory research, process monitoring and control, data logging, analytical chemistry, test and analysis of physical phenomena, and control of mechanical or electrical machinery, to name a few examples.

A typical DAQ system comprises a computer system with DAQ hardware, wherein the DAQ hardware is typically plugged into one of the I/O slots of the computer system. A DAQ system also typically includes transducers and other detecting means for providing "field" electrical signals representing a process, physical phenomena, equipment being monitored or measured, etc. The field signals are provided to the DAQ hardware. In another common DAQ system configuration, the DAQ hardware is coupled to the computer system via other means such as through a VXI (VME extensions for Instrumentation) bus, a GPIB (General Purpose Interface Bus), a serial port, or parallel port of the computer system. Optionally, the DAQ system includes signal conditioning modules which receive the field signals and condition the signals to be acquired.

The DAQ hardware is configured and controlled by DAQ software executing on the computer system. The DAQ software for configuring and controlling the DAQ system typically comprises two portions: the device interface or driver level software and the application software, or the application. The driver level software serves to interface the DAQ hardware to the application. The driver level software is typically supplied by the manufacturer of the DAQ hardware or by some other third party software vendor. An example of DAQ driver level software is NI-DAQ from National Instruments Corporation. The application or client is typically developed by the user of the DAQ system and is tailored to the particular function which the user intends the DAQ system to perform. The DAQ hardware manufacturer or third party software vendor sometimes supplies the application software for certain applications which are common, generic or straightforward.

The Universal Serial Bus is a serial peripheral bus standard developed for computer system peripheral devices. The USB is an external serial bus which supports data exchange between a host computer and a wide range of peripheral devices. The USB provides two wire, point-to-point signaling in which the signals are differentially driven at a bit rate of 12 megabits per second.

USB systems are generally defined in terms of (1) interconnects, (2) devices, and (3) hosts. The USB interconnect defines the manner in which the USB devices are connected to and communicate with the USB host. The host computer system USB interface is referred to as the host controller. The host controller may be implemented in a combination of hardware, firmware, or software. USB devices are defined as (1) hubs, which provide additional attachment points to the USB, or (2) functions, which provide capabilities to the system; e.g., an ISDN connection, a digital joystick, or speakers. Hubs indicate the attachment or removal of a USB device in its per port status bit. The host determines if a newly attached USB device is a hub or a function and assigns a unique USB address to the USB device. All USB devices are accessed by a unique USB address. Each device additionally supports one or more endpoints with which the host may communicate. The remaining description will be limited to USB devices defined as functions.

The USB supports functional data and control exchange between the USB host and USB devices. USB data transfers take place between host software and a particular endpoint on a USB device. The USB host, e.g., the host computer system, interacts with USB devices through the host controller. The host controller is responsible for detecting the attachment and removal of USB devices, managing control flow between the host and USB devices, managing data flow between the host and USB devices, collecting status and activity statistics, and providing a limited amount of power to attached USB devices. The USB system software on the host manages interactions between the USB devices and device software. Further background concerning the USB may be obtained from USB Specification, Revision 1.0 which is incorporated herein by reference.

In prior art systems, e.g., prior art instrumentation systems, the host CPU obtains data from a peripheral device, such as a data acquisition card, using either DMA transfers or interrupt driven requests. DMA transfers typically use burst transfers for improved performance. However, for interrupt driven requests, the host software is typically required to read one sample at a time. In other words, for interrupt drive requests, host software is typically configured to read data one sample at a time from a local peripheral device, e.g., from a PCI DAQ device.

DMA transfers have generally not been possible for USB transfers between a host computer system and a USB device. This is because USB does not provide true DMA support. Thus, for USB transfers, the host controller typically utilizes existing driver level software which operates to read or communicate data with the USB device either one sample at a time or a buffer of data which is passed to the NI-DAQ driver one sample at a time. Thus, when this existing driver level software is used, the host controller has generally been required to read data from a USB DAQ device one sample at a time across the USB.

However, due to the high latencies of the USB, a read of one sample at a time results in slow data transfer rates. For example, the time required to read 100,000 samples from the USB device would be no faster than 100,000 samples times 0.003 seconds/sample which equals 300 seconds, i.e., 333 samples per second. Thus, simple data acquisition tasks using a USB DAQ device take a very large amount of time. Alternatively, the existing driver level software can be modified to take advantage of USB packet transfers. However, this may require a large modification to existing software, which is undesirable.

U.S. patent application Ser. No. 09/062,893 titled "System and Method for Optimizing Serial USB Device Reads Using Virtual FIFO Techniques" discloses virtual buffer techniques for greatly improving the performance of USB devices with minimal software changes. The virtual buffer software increases USB data transfer rates in the USB-based data acquisition system with minimal changes to DAQ driver level software. The virtual buffer software operates to receive or intercept calls made by the DAQ driver level software to acquire data from the device. The virtual buffer software intercepts the call and requests the data in bulk packets from the device. The virtual buffer software then receives the bulk packets and stores the received packets of data in a virtual buffer or virtual FIFO maintained in computer system memory. When a determined amount of data is stored in the virtual FIFO, the virtual buffer software generates an interrupt to the driver software. The driver software then reads the data one sample at a time from the computer memory. These reads occur much more quickly, since the data is read from computer memory instead of from the USB device across the USB bus.

The virtual buffer software emulates operation of the device, including generation of interrupts and responses to status register reads, thus "fooling" the DAQ driver level software into thinking the data is being acquired from the device. Thus, the above application discloses a system which allows for much faster data transfers, while requiring minimal or no changes to the existing DAQ driver level software.

However, this virtual buffer technique involved transferring data from the virtual FIFO (in computer memory) to the driver software (at another location in computer memory) one sample at a time. This was primarily because the existing driver level software was designed to read one sample at a time, and it was undesirable to change the driver level software.

DMA techniques involve acquiring data in large packets and providing these large packets directly a memory location specified by the requesting software. Thus, DMA techniques would provide increased performance 500% over virtual buffer techniques. However, as noted above, DMA techniques are generally not possible in USB systems.

Therefore, an improved system and method is desired which provides increased performance for USB devices. It is also desirable to improve the performance of USB devices with minimal impact on existing software and drivers. It is further desirable to provide DMA-type performance in USB systems.

SUMMARY OF THE INVENTION

The present invention comprises a system and method for emulating DMA operations in software for improved data transfers. The system and method operate in a data acquisition system comprising a computer system and a device coupled to the computer system through a serial bus. The serial bus is preferably the Universal Serial Bus (USB), and the device is preferably a USB DAQ device. The computer system includes driver software, preferably DAQ driver level software, and serial bus driver software, preferably USB software. The computer system also includes virtual DMA software according to the present invention.

The virtual DMA software increases USB data transfer rates in the USB-based data acquisition system with minimal changes to DAQ driver level software. The virtual DMA software operates to receive or intercept calls made by an application or the DAQ driver level software to configure a hardware DMA device. The virtual DMA software intercepts the call and provides a virtual DMA implementation for improved performance. Thus, the computer system may not include a hardware DMA device, and the virtual DMA software emulates operation of the hardware DMA device. The virtual DMA software emulates operation of the hardware DMA device invisibly to both the application and the driver software. The virtual DMA software also operates without substantial modification to the driver software. Thus driver software which presumes the use of hardware DMA can still operate in systems where hardware DMA is not possible.

An application executing in the computer system first makes a call to program a DMA controller to perform an acquisition of data, wherein the call includes one or more addresses in computer memory. When the application makes the call, the virtual DMA software receives the call and requests the data from the device in one or more packets. When the data is received, the virtual DMA software stores the data in the computer memory at the one or more addresses. The virtual DMA software may then generate an interrupt to the device driver software indicating that the data is stored in the computer memory.

The DAQ driver level software thus obtains the data from the computer system memory using much faster transfers, e.g., up to 500,000 bytes per second. The virtual DMA emulates a hardware DMA operation, thus "fooling" the DAQ driver level software into thinking the data is being acquired from the device using DMA. Thus, the present invention allows for much faster data transfers, while requiring minimal or no changes to the existing DAQ driver level software.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
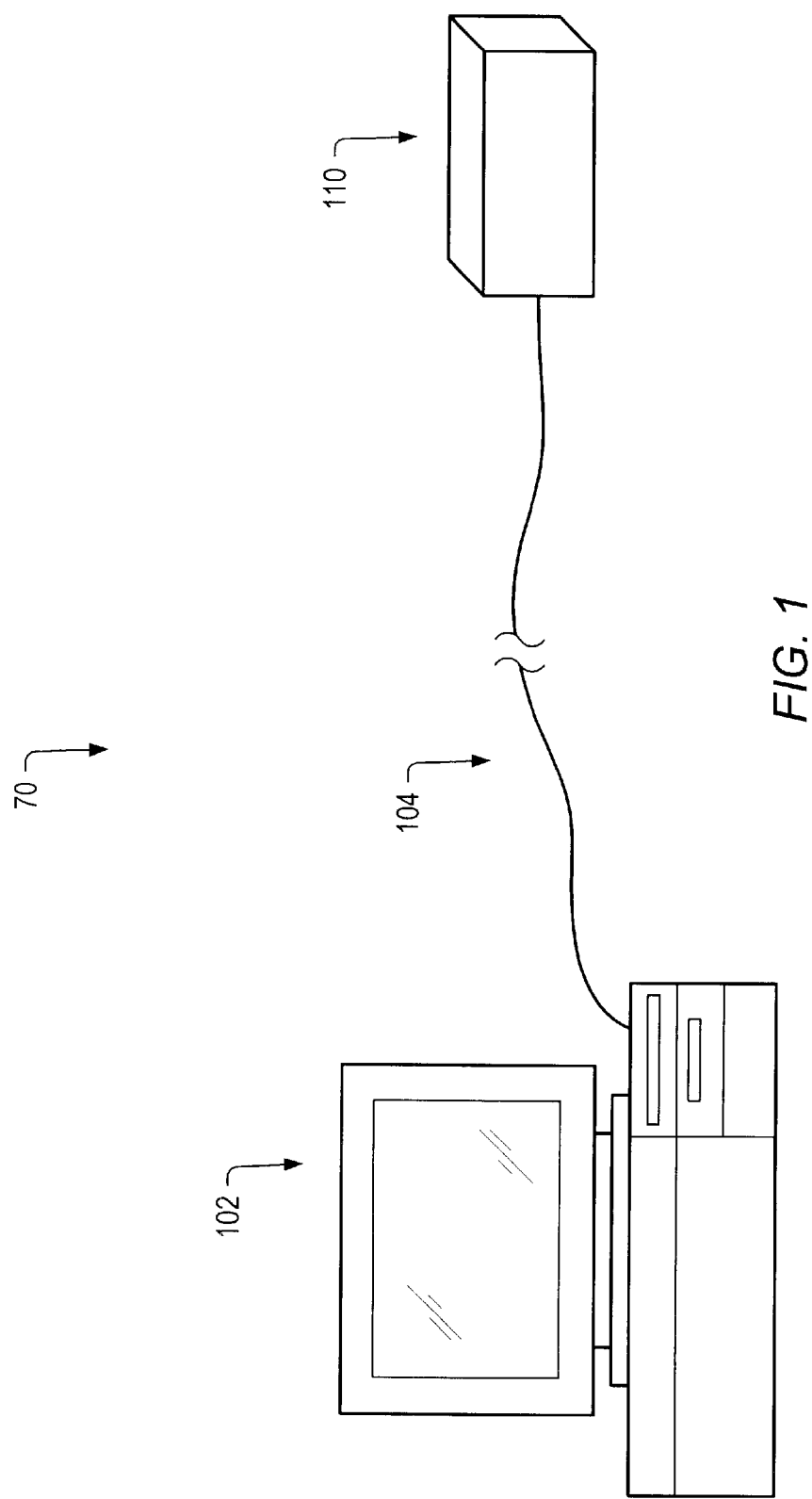
FIG. 1 illustrates a computer system including a USB-based DAQ device.

FIG. 1—USB DAQ System

FIG. 1 illustrates a USB-based I/O system 70 according to one embodiment of the present invention. In the preferred embodiment, the I/O system is a data acquisition (DAQ) system. However, the present invention may be implemented in any of various USB-based I/O systems 70, such as data acquisition systems, test and measurement systems, industrial automation systems, video systems, audio systems, and multimedia systems, among others. The present invention is described below with reference to a data acquisition system as one example of the operation of the invention.

As shown, the DAQ system 70 includes a computer 102. The computer 102 preferably includes various standard components, including at least one central processing unit (CPU), non-volatile memory such as a hard drive, system memory, one or more buses, and a power supply.

A USB I/O device 110, preferably a data acquisition (DAQ) device, is coupled through a universal serial bus (USB) cable 104 to the computer system 102. The USB DAQ device 110 interfaces to a unit under test (UT) or process for which data acquisition/generation is desired. In the preferred embodiment, the USB DAQ system includes transducers or other detecting means (not shown) which provide field electrical signals to the USB DAQ device 110, optionally through signal conditioning circuitry (not shown).

Examples of USB DAQ device 110 are the following products available from National Instruments Corporation: DAQPad-6020E for USB, DAQPad-6507, and DAQPad-6508.

As noted above, in the preferred embodiment the USB device 110 is a DAQ device. However, the USB device 110 may be any of various devices or peripherals, including a keyboard, mouse, speakers, sound card, video card, graphics card, digital video input/output device, printer, or other types of I/O devices.

The preferred embodiment of the present invention utilizes a USB serial bus and a USB device. However, it is noted that the present invention will be used in various types of serial buses, such as GPIB. Also, the computer 102 may comprise any of various types of computers or systems, as desired, including a general purpose computer, a VXI chassis including one or more VXI boards, or a PXI (PCI extensions for instrumentation) chassis, as well as others. FIG. 1 shows host computer 102 connected, via USB bus 104, to a single USB device 110. However, the invention should not be limited thereto, it being understood that the present invention has application to host computer 102 connected to several USB devices 110 via USB 104.

The computer 102 preferably includes a memory media on which computer programs according to the present invention are stored. As used herein, the term "memory media" is intended to include a system memory, such as DRAM, SRAM, EDO RAM, DR DRAM, etc., a non-volatile memory such as a magnetic media, e.g., a hard drive or optical storage, or an installation media, such as floppy disk(s) 110, or a CD-ROM, on which the computer programs according to the present invention are stored for loading into the computer system. The term "memory media" may also include other types of memory.

The memory media may be comprised in the computer 102 or may be located on a second computer which is coupled to the computer 102 through a network, such as the Internet. In this instance, the second computer operates to provide the program instructions to the computer 102 for execution.

The software programs of the present invention are stored in a memory media of the respective computer 102, or in a memory media of another computer, and executed by the CPU. The CPU executing code and data from the memory thus comprises a means for configuring and controlling one or more USB devices 110 according to the steps described below.

Figure 2:
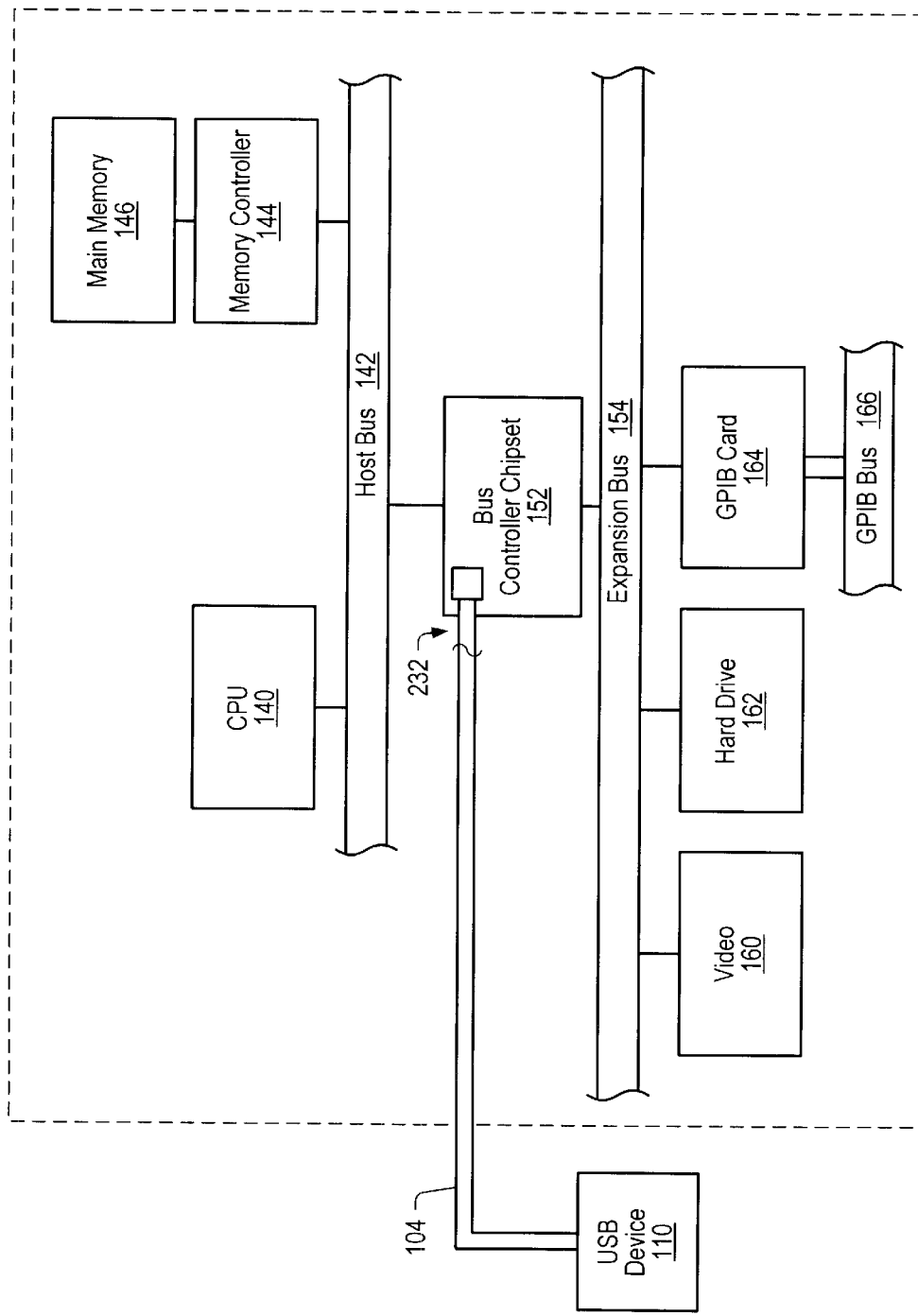
FIG. 2 is a block diagram of the computer system of FIG. 1.

FIG. 2—Computer Block Diagram

FIG. 2 illustrates a representative block diagram of the computer system 102. It is noted that the computer system 102 may have various different architectures, as desired. The elements of a computer system not necessary to understand the operation of the present invention have been omitted for simplicity.

The computer system 102 includes a central processing unit or CPU 140 which is coupled to a processor or host bus 142. The CPU 140 may be any of various types, including an Intel x86 processor such as the Pentium class from Intel, a PowerPC CPU from the Motorola family of processors, as well as others.

Main memory 146, also referred to as system memory 146, is coupled to the host bus 142 by means of memory controller 144. The system memory 146 stores various software used in the USB DAQ system 70, including a DAQ application, DAQ driver level software, and USB driver software according to the present invention. The DAQ driver level software is preferably NI-DAQ from National Instruments.

The system memory 146 also stores virtual DMA software according to the present invention. The virtual DMA software implements the virtual DMA features of the present invention. In the preferred embodiment, the virtual DMA software is comprised in the USB driver software. However, it is noted that the virtual DMA features of the present invention may be implemented in any of various software programs, as desired. The system memory 146 may store other software or other DAQ related software, as desired.

Host bus 142 is coupled to an expansion or input/output bus 154 by means of a bus controller 152, also referred to as chipset logic 152. The chipset logic 152 is preferably the Triton chipset or other similar chipset logic available for computer systems which implement USB. The chipset logic 152 includes USB interface logic 232 which couples to one or more USB ports. The USB ports are for coupling to USB cable 104 and hence for interfacing to the USB I/O device 110. It is noted that the USB interface logic 232 may be comprised in various different parts of the computer system, as desired.

The expansion bus 154 is preferably the PCI (Peripheral Component Interconnect) bus. The expansion bus 154 includes slots for various devices, including video 160.

A non-volatile memory or hard drive 162 is comprised in the computer system 102 and may be coupled to the expansion bus 154 or to the chipset 152, or to other logic. The non-volatile memory 162 stores an operating system, DAQ software, as well as other application programs, for loading into the system memory 146 as known in the art. Various other devices may be connected to the expansion bus 154, as desired.

Figure 3:
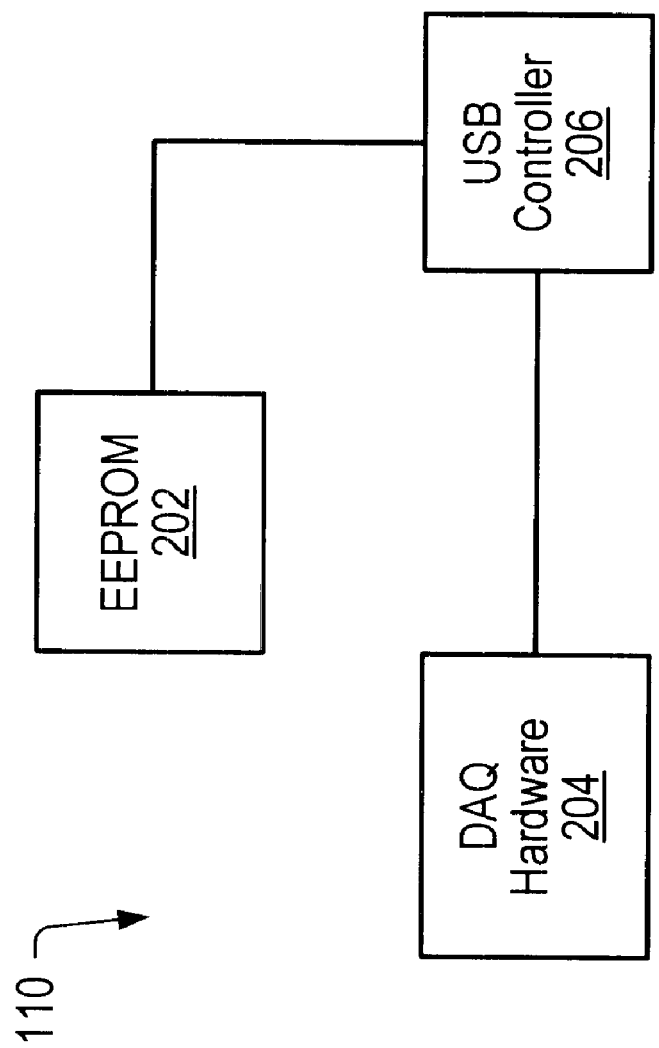
FIG. 3 is a block diagram of the USB-based DAQ device of FIG. 1.

FIG. 3—USB I/O Device

FIG. 3 is a block diagram of the USB-based DAQ device 110. As shown, the USB DAQ device 110 includes DAQ hardware 204, a USB controller 206 and an EEPROM (Electrically Erasable Programmable Read Only Memory) 202. The DAQ hardware 204 comprises the data acquisition hardware circuitry which performs data acquisition/generation functions, as is well known in the art. The USB controller 206 performs USB interface functions. The EEPROM stores instructions and data for performing USB activities, such as reading a byte or word from the control pipe.

FIG. 4

Figure 4:
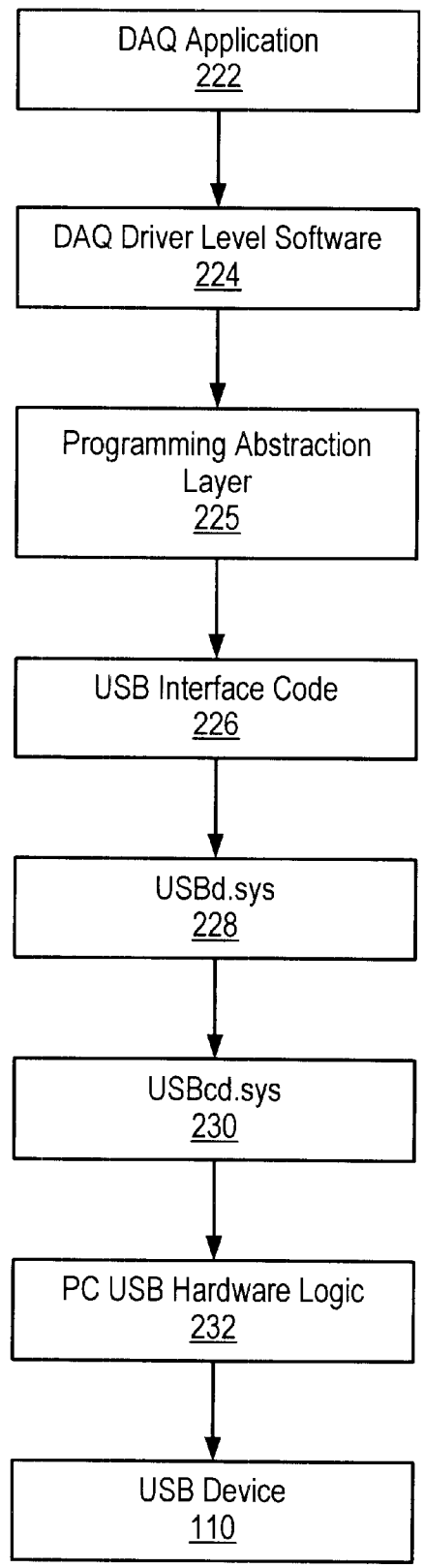
FIG. 4 illustrates the software components comprised in the computer system of FIG. 1.

FIG. 4 illustrates the software components comprised in the computer system 102 according to the preferred embodiment. As shown, the computer system includes a data acquisition application 222, DAQ driver level software 224, also referred to as device driver software, a platform abstraction layer (PAL) layer 225, USB interface code 226, also referred to as serial bus driver software, a USBd.sys program 228, and a UHcd.sys (universal host chip driver) program 230. These software components 222–230 operate to interface through the PC USB hardware logic 232 to communicate with the USB device 110.

The DAQ application 222 comprises an application which performs a data acquisition function, such as requiring or generating data to perform a desired test and measurement operation or other type of operation. The DAQ application 222 includes calls to the DAQ driver level software 224. The DAQ application 222 may be a LabVIEW program, or a textual program written in, for example, C or C++.

As mentioned above, in the preferred embodiment the DAQ driver level software 224 is the NI-DAQ software program from National Instruments Corporation. The DAQ driver level software 224 includes various functions or operations which operate to control a data acquisition device. In the preferred embodiment where the DAQ device is a USB DAQ device 110, the DAQ driver level software 224 interfaces to USB interface code 226. The DAQ driver level software 224 is referred to generally as driver software or device driver software.

The platform abstraction layer (PAL) software 225 operates to abstract the operating system type and bus type from higher layer code. The PAL software 225 includes various services, including a DMA service for providing DMA capabilities to upper-level driver code. PAL sends commands to the appropriate bus or driver associated with a bus (e.g., PCI, USB, or IEEE 1394).

The USB interface code 226 performs the functions of interfacing to the universal serial bus or USB in response to functions being performed by the DAQ driver level software 224. In the preferred embodiment of the invention, the USB interface code 226 is designed to minimize the impact on the DAQ driver level software 224. In other words, the USB interface code 226 is preferably designed so that the fact that the DAQ device is a USB DAQ device 110 is substantially transparent or invisible to the DAQ driver level software 224.

In the preferred embodiment, the USB interface code 226 includes the virtual DMA software of the present invention. As described below, the virtual DMA software operates to receive or intercept calls made by the DAQ driver level software 224 or application 222 to program a DMA controller to acquire data from the device and operates to implement these DMA functions in software, referred to as virtual DMA. The virtual DMA software intercepts the call and requests the data in bulk packets from the device. The virtual DMA software then stores the received packets of data in the computer system memory addresses specified in the original DMA request. The DAQ driver level software 224 thus obtains the data from the computer system memory using much faster transfers. The virtual DMA software emulates operation of the DMA operation, thus "fooling" the DAQ driver level software 224 into thinking the data is being acquired using a hardware DMA controller. Thus, the present invention allows for much faster data transfers, without requiring changes to the existing DAQ driver level software 224 or PAL software 225.

The virtual DMA software of the present invention operates to increase USB performance, i.e., the performance of USB data transfers to/from the USB device 110, while also minimizing impact on the DAQ driver level software code 224, also referred to as the "board code driver".

The USB interface code 226 interfaces to the USBd.sys program 228 and to the UHcd.sys program 230. As is well known, the USBd.sys and the USBcd.sys programs 228 and 230 comprise standard USB drivers which are available from Microsoft Corporation. The USB interface code 226 interfaces to the programs 228 and 230 to control the USB hardware logic 232 comprised in the computer system 102. The PC USB hardware logic 232 then interfaces to the USB device 110, including generating and receiving data transfers to/from the USB device 110.

Figure 5:
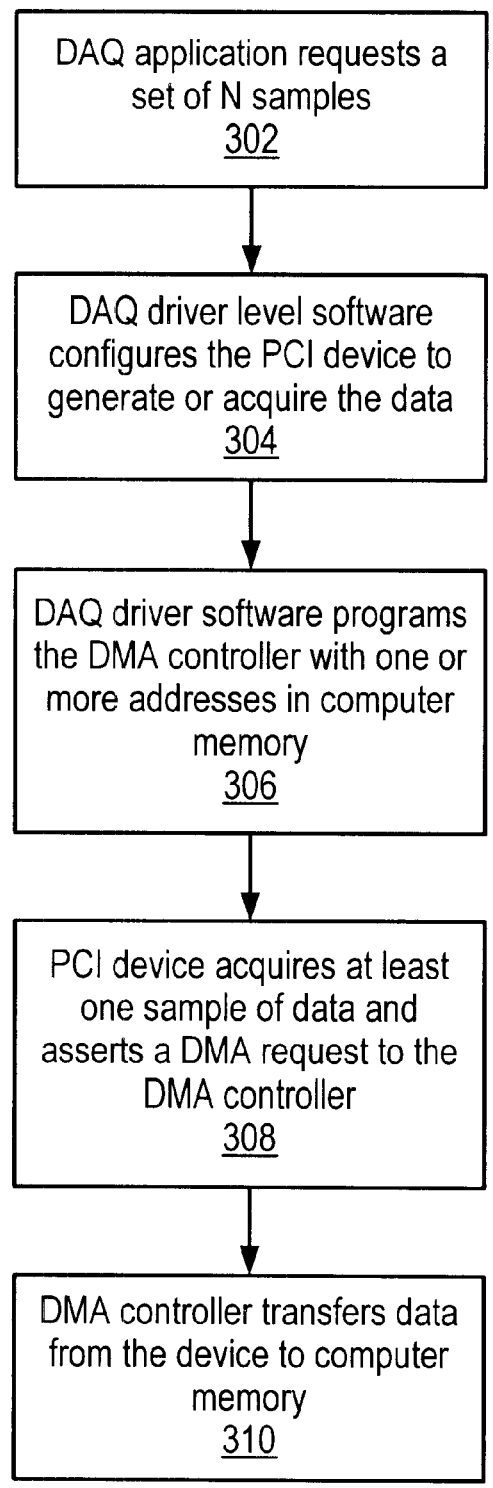
FIG. 5 is a flowchart diagram illustrating a prior art method for acquiring data using a hardware DMA controller.

FIG. 5—Prior Art Operation

FIG. 5 is a flowchart diagram illustrating operation of DAQ driver level software interfacing to a device using hardware DMA transfers according to the prior art. This prior art example assumes the computer system includes a hardware DMA controller, and that the transfers are performed between the device and the host computer using the hardware DMA controller. This prior art example also assumes that the external device is a PCI device.

As shown, in step 302 the DAQ application or user application requests a set of samples, e.g., N samples or 100,000 samples.

In step 304 the DAQ driver level software configures the device, e.g., the PCI device, to generate or acquire the data.

In step 306 the DAQ driver programs the on-board DMA controller, e.g., the DMA controller on the PCI device, to perform the transfer. The DMA controller is programmed to perform the transfer from the PCI device to the computer memory. The DMA controller is programmed with one or more addresses in computer memory where the data is to be stored.

In step 308 the PCI device acquires one or more samples of data, such as from a UUT, and asserts a DMA request to the DMA controller.

In step 310 the DMA controller transfers data from the device to computer memory.

As described above, this example presumes the use of a hardware DMA controller. However, in systems which cannot use a hardware DMA controller, then DMA transfers are not possible.

Figure 6A:
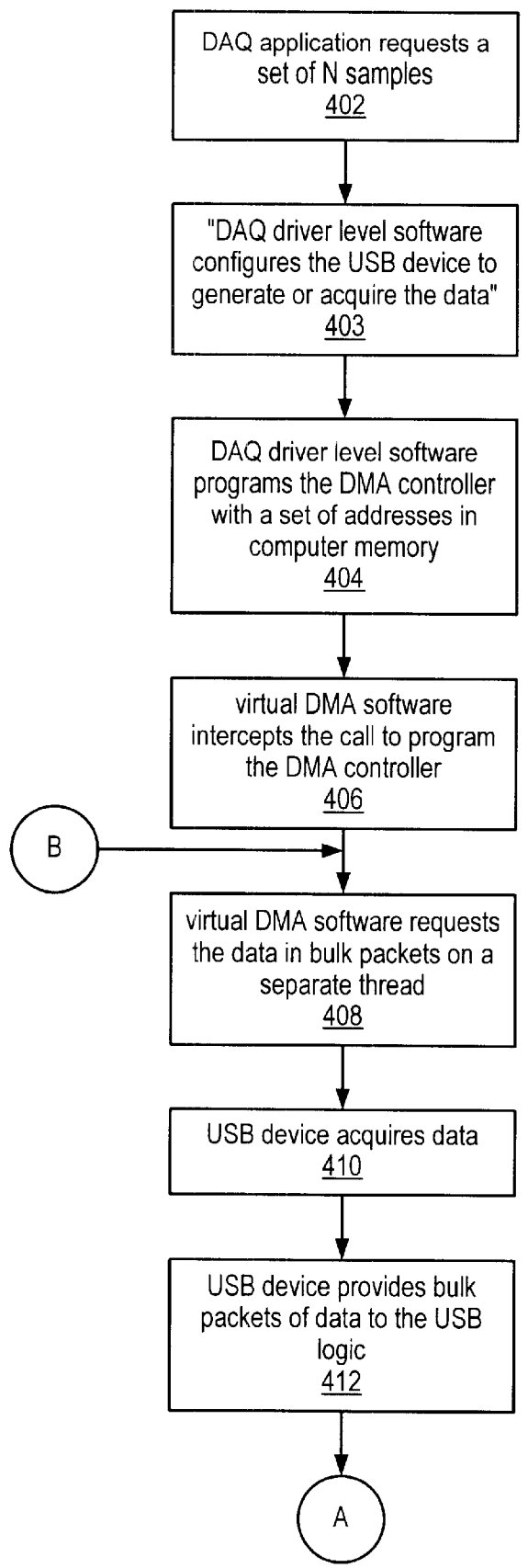
FIGS. 6A and 6B are a flowchart diagram illustrating a method for acquiring data using the virtual DMA software according to the present invention.
Figure 6B:
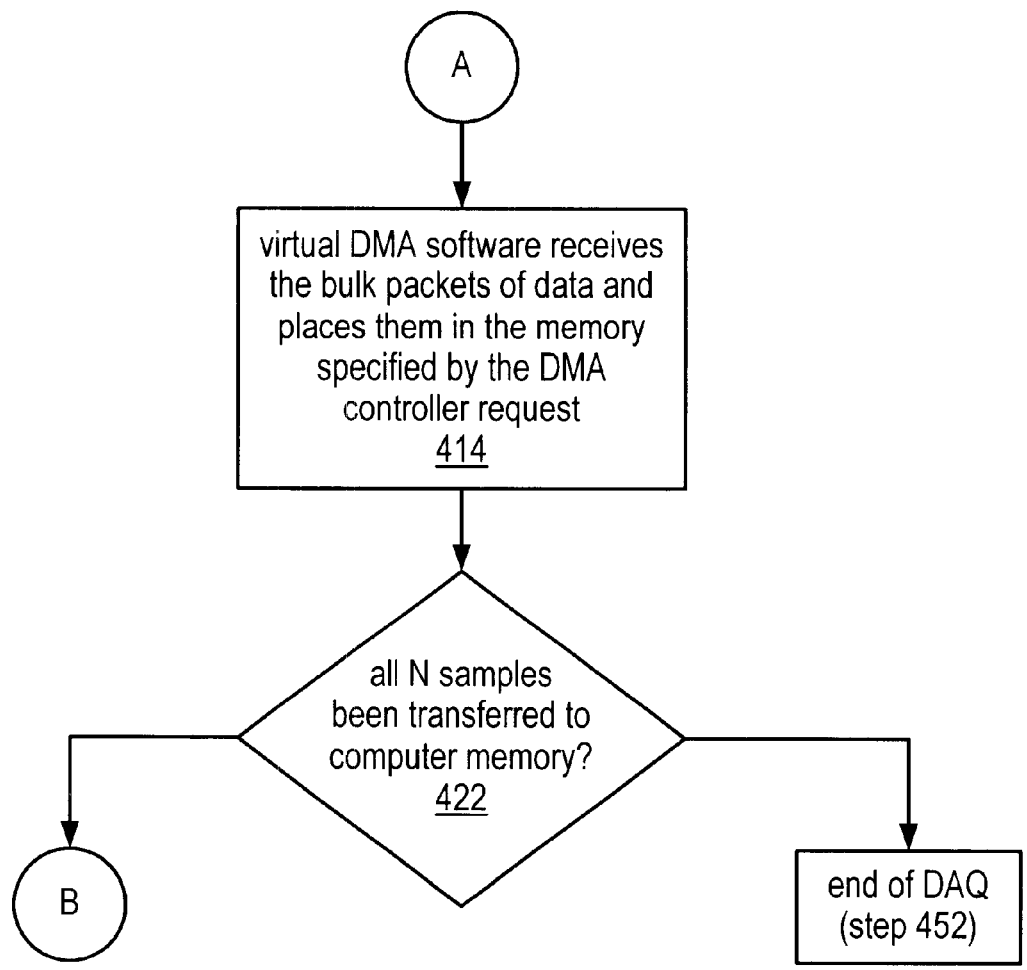

FIGS. 6A and 6B—Flowchart Diagram of Virtual Buffer Operation of the Present Invention FIGS. 6A and 6B are a flowchart diagram illustrating operation of the virtual DMA software of the present invention. According to the present invention, the virtual DMA software allows speeds of 500 K bytes/second without requiring any changes to the device driver software, e.g., the DAQ driver level software.

As noted above, the present invention may be used in any of various types of fields which include data acquisition/generation, including instrumentation, audio, video, printer devices, and other types of I/O device or peripheral data acquisition. The flowcharts of FIGS. 6A and 6B presume a data acquisition example. Also, the flowcharts of FIGS. 6A and 6B presume an acquisition example, but are equally valid for a data generation example, i.e., where data is being generated by the computer 102 for provision to the USB device 110, e.g., to be supplied to the UUT.

As shown, operation of the preferred embodiment of the Virtual DMA software of the present invention is generally as follows. First, in step 402, the DAQ application requests data, e.g., the DAQ application requests a set of N samples. In step 402 the DAQ application preferably makes a call to the DAQ driver level software to request the data.

In step 403 the DAQ driver level software configures the USB device to generate or acquire the data.

In step 404 the DAQ driver level software programs a DMA controller to perform the transfer. This may involve the driver level software, or the application, providing DMA instructions to program the DMA controller with source and destination addresses and the amount of data to be transferred. The destination addresses comprise a set of addresses in computer memory where the data is to be stored.

As discussed above, hardware DMA operations cannot be performed on the USB serial bus 104. In addition, an actual hardware DMA controller may not exist in the system. As discussed below, the virtual DMA software of the present invention operates to intercept this call to program the DMA controller and emulate operation of the DMA controller in software.

In cases where true DMA is possible, such as when the device 110 is a PCI device which supports true hardware DMA, then in step 404 the DAQ driver level software actually programs the DMA controller to perform the transfers, as in the prior art diagram of FIG. 5.

In step 406 the virtual DMA software receives or intercepts the call to program the DMA controller. In the preferred embodiment, the virtual DMA software receives or intercepts the call made by the DAQ driver level software 224. In one embodiment, the virtual DMA software intercepts a DAQ driver level software call to the USB DAQ device.

In step 408 the virtual DMA software requests the data from the USB device 110 in bulk packets, preferably on a separate thread or process. Thus, whereas the DAQ driver level software 224 would ordinarily perform reads a sample at a time without the use of DMA, the virtual DMA software operates to request the data from the USB device 110 in bulk packets, thus allowing much faster transfers.

In step 410, in response to the request from the virtual DMA software, the USB device acquires the data from the respective unit under test or system/process. In step 412 the USB device 110 provides bulk packets of data to the USB logic 232 in the host computer.

In step 414 the virtual DMA software receives the bulk packets of data and places them in the memory specified by the DMA controller request. Thus, when the virtual DMA software receives the bulk packets from the USB device 110 in step 414, the virtual DMA software places the data into the memory specified by the DMA controller request. Thus the received data is placed directly in the "user buffer", i.e., the buffer in computer memory used by the driver software and/or application. Thus the data is immediately useable by the application without further transfer.

After step 414, in step 422 the virtual DMA software preferably determines whether all N samples have been transferred to the computer memory. If all N samples have not been transferred to the computer memory, then operation returns to step 408, and the virtual DMA software again operates to request the data in bulk packets. If all N samples are determined to have been transferred to the computer memory in step 422, then an "end of DAQ" condition exists, and operation proceeds to step 452. An "end of DAQ" condition indicates that the USB device 110 has stopped generating or providing data.

Steps 402–422 preferably are repeated one or more times until operations are completed. In the DAQ example of the preferred embodiment, steps 402–422 are repeated until an end of DAQ is received, which indicates that the USB device 110 has stopped generating or providing data.

Thus, according to the present invention, the DAQ driver level software operates to request or program DMA transfers, even in instances when hardware DMA transfers are not possible. The virtual DMA software of the present invention operates to emulate a hardware DMA controller where necessary, thus providing faster transfers. As a result, the DAQ driver level software is essentially "fooled" into believing that DMA is available and is actually being performed.

The virtual DMA software also allows the driver level software to operate without modification, regardless of the existence of hardware DMA support. Thus the driver software operates the same whether or not "true DMA" or "hardware DMA" is available. Thus the driver software operates the same regardless of whether the device is a PCI device which supports hardware DMA transfers or the device is a USB device which does not support hardware DMA transfers. This greatly simplifies the driver software.

Figure 7:
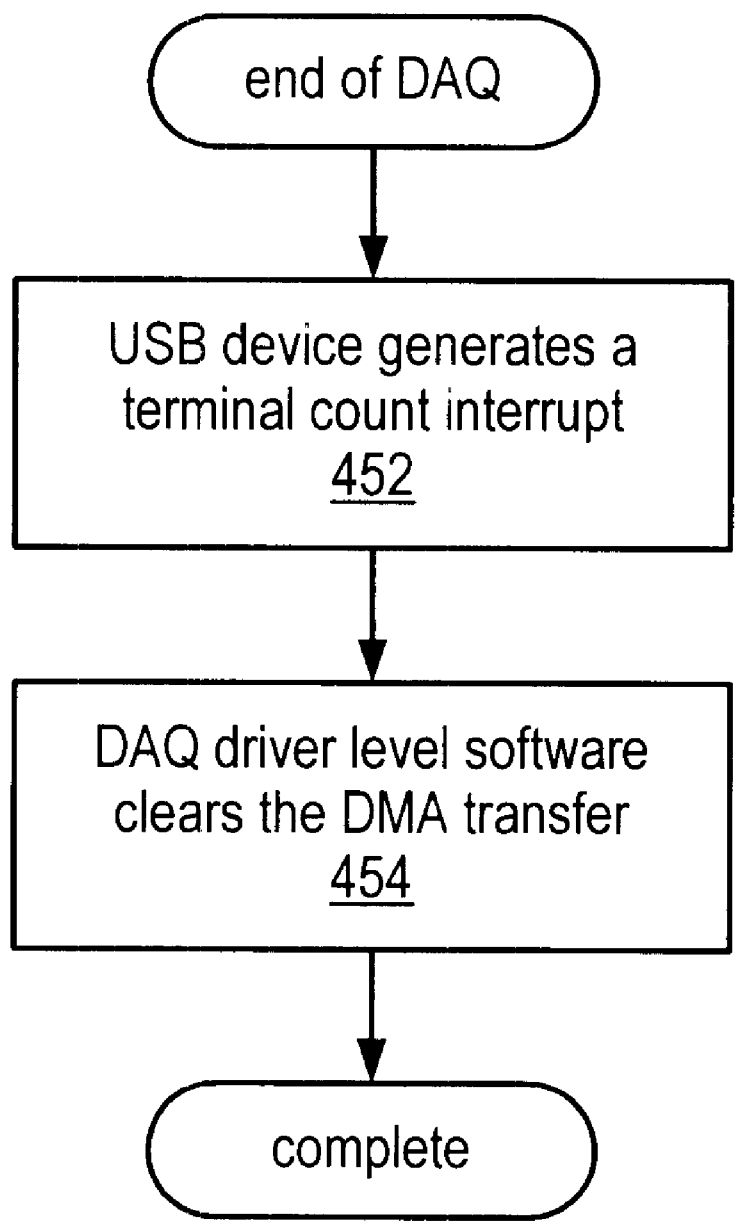
FIG. 7 is a flowchart diagram illustrating an end of DAQ operation after operation of the flowchart of FIGS. 6A and 6B.

FIG. 7—End of DAQ Operations

FIG. 7 is a flowchart diagram illustrating operation when data acquisition/generation operations are completed, i.e., steps 402–422 have been executed one or more time to acquire or generate a plurality of data samples. As shown, in step 452 the USB device 110 generates a terminal count interrupt indicating that the data acquisition operation has completed.

In response to the terminal count interrupt, in step 454 the DAQ driver level software ISR routine clears the DMA transfer, and operation completes.

DAQ Driver Level Software Requirements

The DAQ driver level software or board code has several requirements in the preferred embodiment.

The DAQ driver notifies the NIDAQUSB driver in advance the sample rate of acquisition. This allows the virtual DMA software to determine the optimized packet size to request in step 408.

In the preferred embodiment, existing application programs and I/O drivers require no modifications to use the present invention. In other words, the virtual DMA techniques are transparent to the application program and I/O drivers.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing data transfers in a system comprising a computer system and a device coupled to the computer system through a serial bus, wherein the computer system includes virtual DMA software, the method comprising;
    a) providing instructions to program a DMA controller to perform an acquisition of data, wherein the instructions include one or more destination addresses in computer memory;
    b) the virtual DMA software receiving the instructions to program the DMA controller;
    c) the virtual DMA software requesting data from the device in one or more packets after said receiving;
    d) the computer system receiving the packets of data from the device;
    e) the virtual DMA software storing the data in the computer memory at the one or more destination addresses in response to receiving the packets of data.

2. The method of claim 1, wherein the computer system does not include a hardware DMA controller;
wherein the virtual DMA software emulates operation of a hardware DMA controller.

3. The method of claim 1, wherein the computer system includes driver software, the method further comprising:
an application executing in the computer system requesting data from the device;
wherein the driver software provides the instructions to program the DMA controller in response to the application requesting data from the device.

4. The method of claim 3, wherein the computer system does not include a hardware DMA controller;
wherein the virtual DMA software emulates operation of a hardware DMA controller;
wherein the driver software is not aware that the acquisition of data is not being performed by a hardware DMA controller.

5. The method of claim 4, further comprising
generating an interrupt to the driver software indicating that the data is stored in the computer memory.

6. The method of claim 4, wherein the computer system includes serial bus driver software, wherein the virtual DMA software is comprised in the serial bus driver software.

7. The method of claim 4, wherein the virtual DMA software operates without substantial modification to the driver software.

8. The method of claim 4, wherein the device is a data acquisition device, wherein the driver software comprises data acquisition driver software.

9. The method of claim 1, wherein the serial bus is the Universal Serial Bus (USB), wherein the device is a USB device.

10. A method for performing data transfers in a system comprising a computer system and a device coupled to the computer system through a serial bus, the method comprising;
providing instructions to program a DMA controller to perform an acquisition of data, wherein the instructions include one or more destination addresses in computer memory;
emulating operation of the DMA controller in software to perform the acquisition of data in response to said providing instructions, wherein said emulating comprises:
receiving the instructions to program the DMA controller;
requesting data from the device in one or more packets after said receiving;
the computer system receiving the packets of data from the device; and
storing the data in the computer memory at the one or more destination addresses in response to receiving the packets of data.

11. The method of claim 10, wherein the computer system includes virtual DMA software, wherein the virtual DMA software performs said emulating.

12. The method of claim 11, wherein the computer system does not include a hardware DMA controller;
wherein the virtual DMA software emulates operation of a hardware DMA controller.

13. The method of claim 10, wherein the computer system includes driver software, the method further comprising:
an application executing in the computer system requesting data from the device;
wherein the driver software provides the instructions to program the DMA controller in response to the application requesting data from the device.

14. The method of claim 13, wherein the computer system does not include a hardware DMA controller;
wherein the virtual DMA software emulates operation of a hardware DMA controller;
wherein the driver software is not aware that the acquisition of data is not being performed by a hardware DMA controller.

15. A data acquisition (DAQ) system, comprising:
a computer system, wherein the computer system includes memory which stores data, wherein the computer system includes DAQ driver software, and wherein the computer system also includes virtual DMA software;
a serial bus coupled to the computer system; and
a data acquisition (DAQ) device coupled to the computer system through the serial bus;
wherein the computer system includes driver software which is executable to provide instructions to program a hardware DMA controller in the computer system to obtain data from the DAQ device, wherein the instructions include one or more destination addresses in computer memory;
wherein the virtual DMA software is executable to receive the instructions to program the hardware DMA controller, wherein the virtual DMA software is executable to request data from the device in one or more packets, receive the packets of data from the device, and store the data in the computer memory at the one or more destination addresses in response to receiving the packets of data.

16. The DAQ system of claim 15, wherein the virtual DMA software operates to emulate operation of the hardware DMA controller.

17. The DAQ system of claim 15, wherein the virtual DMA software operates without modification to the driver software.

18. The DAQ system of claim 15, wherein the serial bus is the Universal Serial Bus (USB).

19. A memory media which comprises program instructions for performing data transfers in a system comprising a computer system and a device coupled to the computer system through a serial bus, wherein the computer system includes device driver software, wherein an application comprised in the computer system is executable to make a call to program a hardware DMA controller to obtain data from the device;
wherein, in response to instructions to program a hardware DMA controller to obtain data from the device, the program instructions implement:
receiving the instructions to program the hardware DMA controller, wherein the instructions include one or more destination addresses in the computer memory where the data is to be stored;
requesting data from the device in one or more packets after said receiving;
receiving the packets of data from the device; and
storing the data at the one or more destination addresses in the computer memory specified in the call in response to receiving the packets of data.

20. The memory media of claim 19, wherein the computer system does not include a hardware DMA controller;
wherein the program instructions emulates operation of a hardware DMA controller.

* * * * *